US007525591B2

(12) United States Patent
Yasuda

(10) Patent No.: US 7,525,591 B2
(45) Date of Patent: Apr. 28, 2009

(54) IMAGE DISPLAY APPARATUS HAVING IMAGE CORRECTION FUNCTION

(75) Inventor: Tomonaga Yasuda, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 452 days.

(21) Appl. No.: 11/438,765

(22) Filed: May 23, 2006

(65) Prior Publication Data

US 2006/0274180 A1 Dec. 7, 2006

(30) Foreign Application Priority Data

Jun. 2, 2005 (JP) ............................ 2005-162633

(51) Int. Cl.
*H04N 5/225* (2006.01)
*H04N 9/68* (2006.01)

(52) U.S. Cl. .................... 348/362; 348/221.1; 348/235; 382/168

(58) Field of Classification Search .............. 348/207.1, 348/222.1, 362, 223, 235; 382/168, 169, 382/274

See application file for complete search history.

(56) References Cited

U.S. PATENT DOCUMENTS

| | | | | |
|---|---|---|---|---|
| 6,657,658 | B2 * | 12/2003 | Takemura | 348/207.99 |
| 7,215,812 | B1 * | 5/2007 | Masaki | 382/167 |
| 2001/0020978 | A1 * | 9/2001 | Matsui et al. | 348/222 |
| 2002/0154829 | A1 * | 10/2002 | Tsukioka | 382/254 |
| 2004/0179131 | A1 * | 9/2004 | Honda et al. | 348/362 |
| 2004/0207730 | A1 * | 10/2004 | Imai et al. | 348/207.1 |

FOREIGN PATENT DOCUMENTS

| | | |
|---|---|---|
| JP | 2000-092379 | 3/2000 |
| JP | 2005-64647 | 3/2005 |

* cited by examiner

*Primary Examiner*—Tuan V Ho
*Assistant Examiner*—Selam T Gebriel
(74) *Attorney, Agent, or Firm*—Volpe and Koenig, P.C.

(57) ABSTRACT

An image display apparatus for displaying acquired image data on a display part determines whether the acquired image data needs correcting, and when determining that some correction is necessary, causes the display part to show preset correction contents. When an operator selects one of the correction contents displayed, the image display apparatus corrects the acquired data based on the correction content selected.

7 Claims, 6 Drawing Sheets

IMAGE DISPLAY APPARATUS HAVING IMAGE CORRECTION FUNCTION

CROSS-REFERENCE TO RELATED APPLICATION

This application is based upon and claims the benefit of priority from prior Japanese Patent Application No. 2005-162633, filed on Jun. 2, 2005, the entire contents of which are incorporated herein by reference.

BACKGROUND OF THE INVENTION

1. Field of the Invention

The present invention relates to an image display apparatus for displaying acquired image data on a display part.

2. Description of the Related Art

The digital camera has various advantages over the film camera. Among these advantages, the advantage of allowing a user to check an image visually and erase an unnecessary image immediately after shooting is most important. In other words, the digital camera can easily do "trial and error" that is difficult with the film camera.

The digital camera can also control exposure and the like automatically upon shooting. For example, a digital camera described in Japanese Patent Laid-Open No. 2000-92379 divides the brightness of pixels into plural steps of tonal areas to evaluate the brightness of each of the pixels constituting a reference image captured by a CCD prior to actual image pickup. Then, it acquires a histogram showing a distribution of brightness of the pixels to correct the exposure time of the CCD upon actual shooting based on the distribution information.

BRIEF SUMMARY OF THE INVENTION

The image display apparatus of the present invention is to display acquired image data on a display part in such a manner that it determines whether the acquired image data needs correcting, and when determining that the acquired image data needs correcting, causes the display part to show preset correction contents. Then, when an operator selects one of the correction contents displayed, the image display apparatus corrects the acquired image data based on the correction content selected.

The image display apparatus can preferably be configured to determine the need for correction based on whether the image data is beyond a predetermined range of preset normal conditions. For example, the need for correction can be determined according to the brightness distribution of the image data.

According to one aspect of the present invention, there is provided an image display apparatus comprising: a determination part for determining whether acquired image data needs correcting; a correction-content display part for causing a display part to show correction content information preset for items determined to need correcting when the determination part determines that the image data needs correcting; a selection part for allowing an operator to select a correction item for the image data from the correction content information displayed; and a correction part for correcting the acquired image data according to the correction item selected and displaying the corrected image data on the display part.

The present invention can also be understood as the invention of a recording medium recording an image display program and the invention of an image display method for displaying acquired image data on a display part.

According to the present invention, since the apparatus determines the need for correction automatically, a defective condition caused by making no correction can be avoided in advance. When determining that some correction is necessary, the apparatus can make a correction according to user's preferences. Especially when a digital camera or the like is used as one kind of image display apparatus, even if the user is unfamiliar with how to handle the digital camera, the image display apparatus can make it easy for the user to take a picture as intended or to edit the shot image within a predetermined range of normal conditions.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

A preferred embodiment of the invention is described below with reference to the accompanying drawings.

Figure 1:
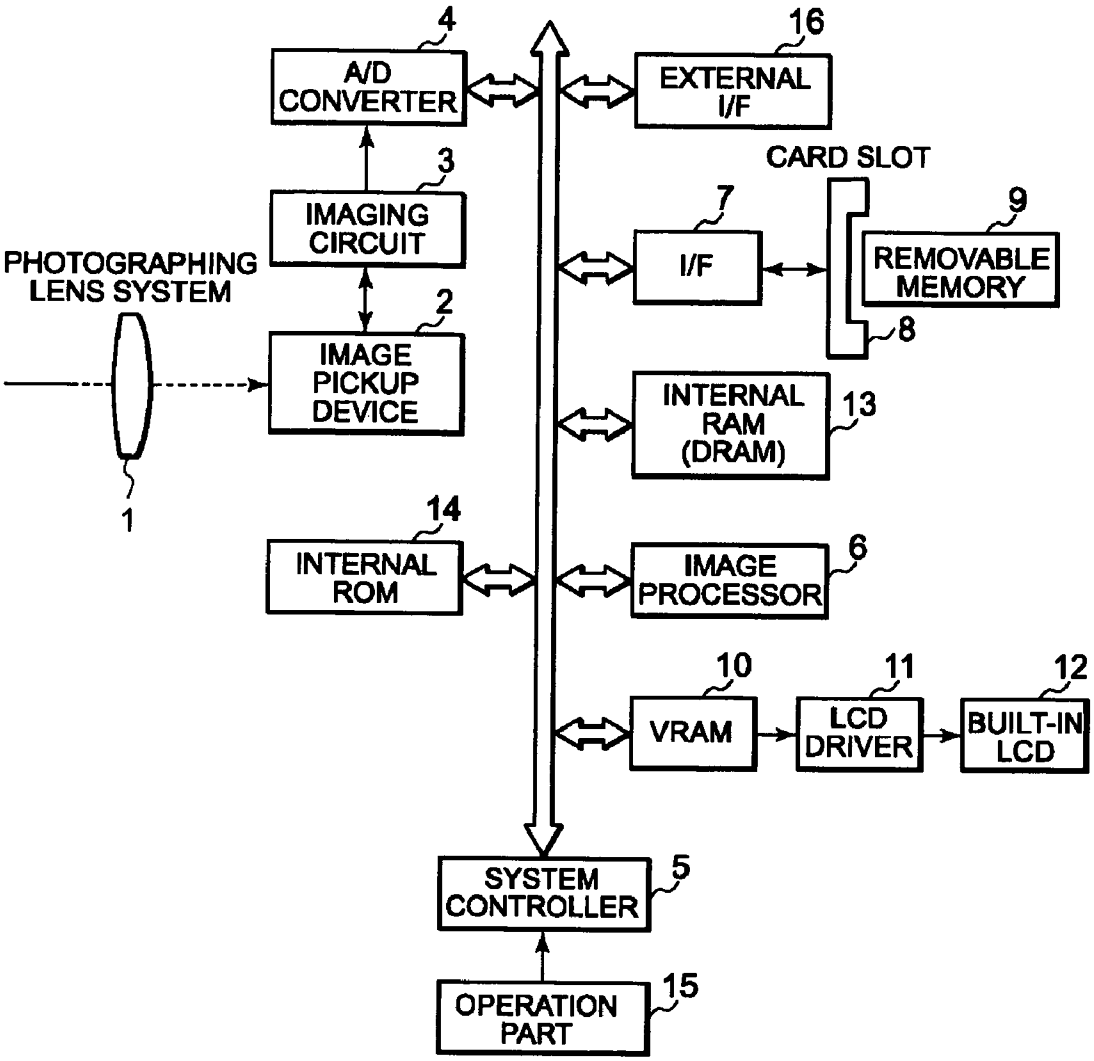
FIG. 1 is a block diagram showing the main part of a digital camera according to a preferred embodiment of the present invention.

FIG. 1 is a block diagram showing the main part of a digital camera according to the preferred embodiment of the present invention.

In FIG. 1, upon shooting with the digital camera, a subject image is formed on an image pickup device 2 through a photographing lens system 1, and photoelectrically converted by the image pickup device 2 into electric signals. The electric signals are subjected to a predetermined imaging process through an imaging circuit 3, and A/D converted by an A/D converter 4 to obtain digital data. The digital data (image data) obtained is temporarily stored in an internal RAM (DRAM) 13. The temporarily stored image data is subjected to predetermined image processing by means of a system controller 5, subjected to predetermined compression processing (e.g., JPEG compression processing) through an image processor 6, and recorded as an image file on a removable memory 9, inserted in a card slot 8, through an I/F 7.

Upon playback, the image data is read from the removable memory 9 through the card slot 8 and the I/F 7, and subjected to predetermined decompression processing (e.g., JPEG decompression processing) through the image processor 6. The image data is then subjected to predetermined image processing by means of the system controller 5, and stored in a VRAM 10 so that an image of the image data stored in the VRAM will be displayed on a built-in LCD 12 via an LCD driver 11.

In FIG. 1, the internal RAM 13 is used not only for temporary storage of image data A/D converted by the A/D converter 4, but also for temporary storage of image data being processed by the image processor 6 and as a work area for the system controller 5 to perform control processing.

The system controller 5 includes a CPU (Central Processing Unit), which reads out and executes a camera program stored in an internal ROM 14 to control the entire operation of the digital camera.

An operation part 15 includes various buttons and switches, such as a shutter button, a mode change button, a power button, an arrow pad, and an OK button, to inform the system controller 5 of the instructions accepted. The shutter button is to instruct shooting, the mode change button is to instruct switching modes between a shooting mode and a playback mode or the like, the power button is to switch on or off the power of the digital camera, the arrow pad is to make a selection and the like, and the OK button is to confirm the selection.

An external I/F 16 enables the exchange of data with an external device such as a PC (Personal Computer) through a USB cable or the like.

The following describes the operation of the digital camera configured as mentioned above.

The digital camera has various user support functions, such as a shooting support function that makes easy user's intended shooting and a still-image editing support function that makes easy user's intended still-image editing. These functions are executed by the system controller 5. To be more specific, a predetermined image display program is recorded in the internal RAM 13 as a recording medium, and the program running on the system controller 5 causes the system controller 5 to execute the various user support functions such as the shooting support function and the still-image editing support function.

In the digital camera, the shooting support function determines the need for correction based on whether a shot image is beyond a predetermined range of present normal conditions. Then, based on the determination result, the shooting support function shows the user possible options of shooting methods expected to fit user's shooting intention. This allows the user to select a desired option, making it easy to set shooting conditions suitable for the user's shooting intention (desired shooting method).

For example, suppose that a subject including a person against a very bright background is captured in a normal auto-shooting mode (where the digital camera automatically captures the subject at an exposure value optimized as far as possible for both the person and the background). Suppose further that the distribution between bright and dark areas of the image obtained goes far beyond the range of preset normal conditions as a result of determination on the tendency of brightness distribution of the image. In this case, the digital camera displays a submenu including selection items as possible options of shooting methods expected to fit the user's shooting intention. For example, the submenu includes the selection items to select (1) a shooting method of adjusting the exposure to the person even though the bright background is overexposed, or (2) a shooting method of adjusting the exposure to the bright background so that the person will be rendered as a silhouette. This submenu is a guide display to make it easy to set an exposure compensation value suitable for the shooting method corresponding to the item selected by the user.

To be more specific, if a bright sky expanding across the upper part of the frame in a composition with a person and background scenery surrounding the person, a bright area (sky) and a dark area (the person and part of the background scenery surrounding the person) will appear in an image to be captured. Therefore, in this case, the brightness distribution of the image has two separate peaks, or "histogram mountains" on the dark and bright sides, respectively. This pattern of brightness distribution with seemingly only two "mountains" is called a "bimodal brightness distribution."

In such a case, the user may want to decide, on a case-by-case basis, whether to shoot the subject at a correct exposure value exactly to fit the person, or in such a way to prevent the bright sky from being overexposed as far as possible, or in such a way to render the subject as a silhouette. Therefore, before or after shooting under such a condition, the camera detects a bimodal brightness distribution and displays the submenu from which the user can select a desired item. This can make it easy to set an exposure compensation value suitable for the above shooting method (1) or (2).

On the other hand, the still-image editing support function determines the need for correction based on whether a captured still image is beyond a predetermined range of present normal conditions. Then, based on the determination result, the still-image editing support function shows the user possible options of still-image editing methods expected to fit user's intention to edit the still image. This allows the user to select a desired option, making it easy to perform image processing suitable for the user's intention to edit the still image (still-image editing method).

For example, suppose that the distribution between bright and dark areas of an image goes far beyond the range of preset normal conditions as a result of determination on the tendency of brightness distribution of the image upon image playback, that is, the brightness of the image has a bimodal distribution. In this case, the digital camera displays a submenu including selection items to select whether to perform image processing to adjust the exposure to the person even though the bright background is overexposed as in the above item (1), or to adjust the exposure to the bright background so that the person will be rendered as a silhouette as in the above item (2). When the user selects a desired item from the selection items, the selected image processing can be performed easily in the same manner as in the above shooting method (1) or (2).

The following describes processing for detecting a bimodal brightness distribution, that is, processing for determining whether the brightness distribution of the image exhibits a bimodal tendency.

Figure 2B:
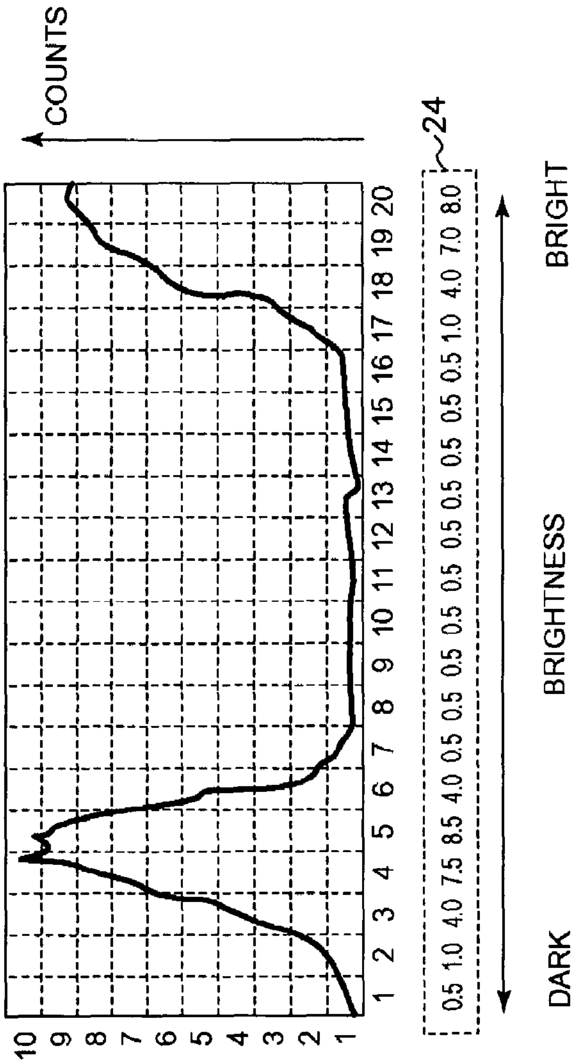
FIG. 2B is a graph to show the brightness distribution of the shot image.
Figure 2A:
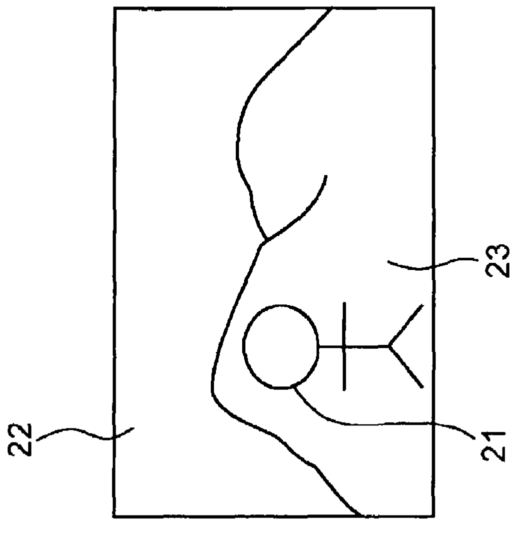
FIG. 2A is a view to show an example of a shot image.

FIG. 2A is a view to show an example of a shot image, and FIG. 2B is a graph to show the brightness distribution of the shot image.

As shown in FIG. 2A, the shot image contains a person 21, a bright background (sky) 22, and a dark background (mountains) 23. FIG. 2B shows the brightness distribution of the image.

In the graph of FIG. 2B, the horizontal axis represents brightness (tone) and the vertical axis represents counts (number of pixels). The brightness becomes lower (darker) on the left and higher (brighter) on the right in FIG. 2B. In the embodiment, the overall range of brightness (overall tonal range) that can be represented as a brightness distribution is divided into 20 equal parts, and the total number of pixels (counts) belonging to each of the divided tonal ranges is determined to obtain the brightness distribution of the image. Further, in the embodiment, the graph of FIG. 2B shows a simplified brightness distribution for convenience of explanation (see the values surrounded by a dotted line 24 in FIG. 2B). In this embodiment, to simplify the explanation, each pixel counts of the divided tonal range, represented one of 1-20 ranges of the horizontal axis in the FIG. 2B, is described in a simplified brightness distribution. In the simplified brightness distribution, value of the brightness is counted by number of grids (memory blocks) of the vertical axis that is within the brightness distribution. One gird that is fully within the brightness distribution is counted as "1" count, partially within the brightness distribution is counted as "0.5" count, and totally out of the brightness distribution is counted as "0" count. In the embodiment, a part of the simplified brightness distribution where three or more consecutive divided tonal ranges in the horizontal axis have three or more grid counts (three or more grids in width, and three or more grids in heights) is recognized as a "histogram mountain." Further, as for the end of the "histogram peak", when a part of the simplified brightness distribution where three or more consecutive divided tonal ranges in the horizontal axis have less than tree grid counts is detected, the starting position of the above part is recognized as the end of a "histogram."

In the case of the brightness distribution in FIG. 2B, an interval of the third to sixth grids of tonal ranges and an interval of the eighteenth to twentieth grids of tonal ranges on the horizontal axis are detected as two "histogram mountains." In other words, the graph of FIG. 2B is determined to exhibit a bimodal brightness distribution.

If three or more "histogram mountains" are detected, the graph is not determined to exhibit a bimodal brightness distribution. It is determined to exhibit a bimodal brightness distribution when only two "histogram mountains" are detected.

In the case of the simplified brightness distribution in FIG. 2B, the area of the mountain on the left side is 24 (=4.0+7.5+8.5+4.0), and the area of the mountain on the right side is 19(=4.0+7.0+8.0).

Although the calculations are made using the easy-to-understand, simplified brightness distribution in the embodiment, it will, of course, be understood that more accurate calculations including those for overexposed and underexposed areas can be made depending on the computation ability of a CPU used upon actual implementation of the invention.

Figure 3:
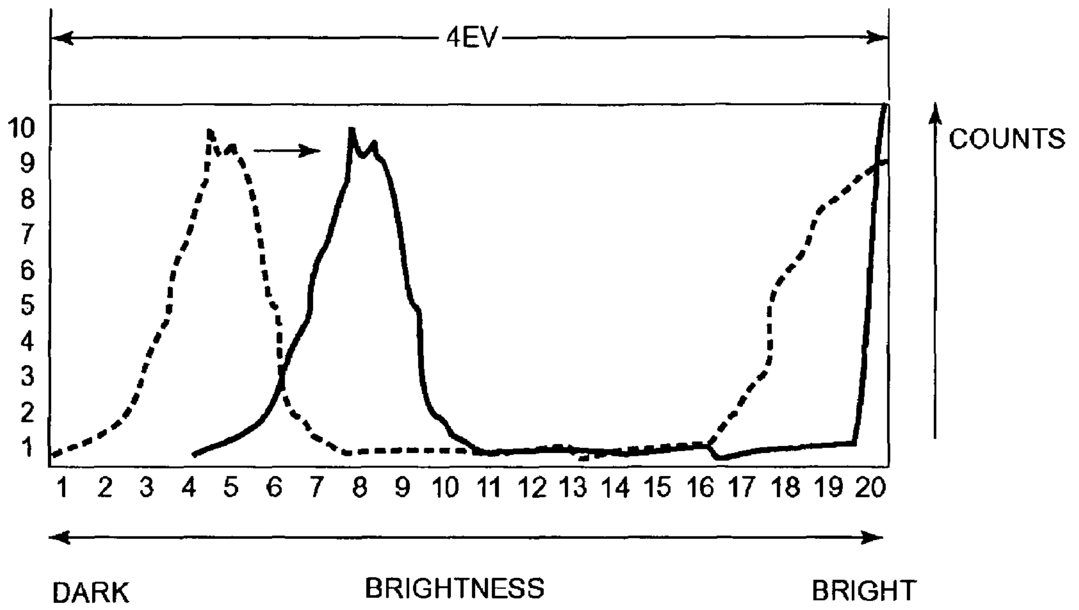
FIG. 3 is a graph to describe how to calculate an exposure compensation value A used when exposure is compensated with more emphasis on a low brightness side.
Figure 4:
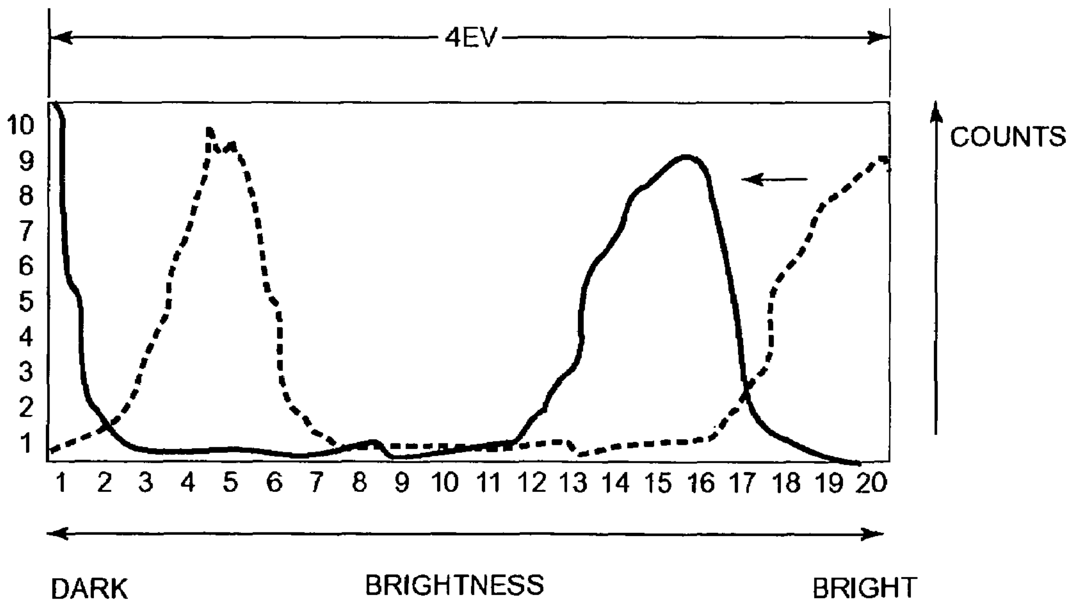
FIG. 4 is a graph to describe how to calculate an exposure compensation value B used when exposure is compensated with more emphasis on a high brightness side.

The following describes, with reference to FIGS. 3 and 4, how the shooting support function calculates, based on the bimodal brightness distribution, an exposure compensation value A used when exposure is compensated with more emphasis on the low brightness side (dark side), and an exposure compensation value B used when exposure is compensated with more emphasis on the high brightness side (bright side).

Referring first to FIG. 3, a description will be made of how to calculate the exposure compensation value A used when exposure is compensated with more emphasis on the low brightness side. The exposure compensation value A is to assign a weight to the low brightness side so that the exposure of a dark subject will be optimized. In calculating the exposure compensation value A, the "histogram mountain" on the high brightness side is virtually ignored, that is, it is assumed not to exist in the bimodal brightness distribution to calculate an exposure compensation value that corrects only the exposure of the subject represented by the "histogram mountain" on the low brightness side. In other words, assuming that the "histogram mountain" on the right side of FIG. 3 does not exist in a bimodal brightness distribution (identical to that in FIG. 2B) as indicated by a dotted line in FIG. 3, an exposure compensation value to shift the left "histogram mountain" to the right is calculated. In this case, the peak of the left "histogram mountain" is shifted to come toward the center of the overall brightness range. The amount of shift corresponds to +6 memory blocks of tonal ranges on the horizontal axis. When exposure is corrected using the exposure compensation value A corresponding to +6 memory blocks, the exposure of the subject on the low brightness side can be optimized.

If the "histogram mountain" on the high brightness side is weighted to some extent without being ignored to calculate an exposure compensation value, such an exposure compensation value A that makes possible more natural exposure compensation can be obtained. In other words, if the right "histogram mountain" is larger than the left "histogram mountain," the exposure compensation value A can be made smaller to reduce overexposed areas as much as possible in the process of correcting the exposure of the image. On the contrary, if the right "histogram mountain" is smaller than the left "histogram mountain," the exposure of the image should be compensated by paying attention to the left "histogram mountain" as much as possible to make possible more natural exposure compensation.

In the case of the exposure compensation with more emphasis on the low brightness side shown in FIG. 3, if the overall brightness range in the graph of the brightness distribution is 4 EV, the exposure compensation value A (whose unit is EV) can be determined by the following equation:

$$A=U\times S1/(S1+S2)\times(4/20),$$

where S1 is the area of the left "histogram mountain," S2 is the area of the right "histogram mountain," and U is a compensation value to correct only the exposure of the left "histogram mountain" in the graph of the brightness distribution.

In this equation, if +6, 24, and 19 are substituted for U, S1, and S2, respectively, the exposure compensation value A is A=+6×24/(24+19)×(4/20)=+0.67 EV. It means that an exposure compensation value of about +⅔ EV can make possible natural exposure compensation.

Referring next to FIG. 4, a description will be made of how to calculate the exposure compensation value B used when exposure is compensated with more emphasis on the high brightness side. The exposure compensation value B is to assign a weight to the high brightness side so that the exposure of a bright subject will be optimized. In calculating the exposure compensation value B, the "histogram mountain" on the low brightness side is virtually ignored, that is, it is assumed not to exist in the bimodal brightness distribution to calculate an exposure compensation value that corrects only the exposure of the subject represented by the "histogram mountain" on the high brightness side. In other words, assuming that the "histogram mountain" on the left side of FIG. 4 does not exist in a bimodal brightness distribution (identical to that in FIG. 2B) as indicated by a dotted line in FIG. 4, an exposure compensation value to shift the right "histogram mountain" to the left is calculated. In this case, the peak of the right "histogram mountain" is shifted to come toward the center of the overall brightness range. The amount of shift corresponds to −10 memory blocks of tonal ranges on the horizontal axis. When exposure is corrected using the exposure compensation value B corresponding to −10 memory blocks, the exposure of the subject on the high brightness side can be optimized.

If the "histogram mountain" on the low brightness side is weighted to some extent without being ignored to calculate an exposure compensation value, such an exposure compensation value B that makes possible more natural exposure compensation can be obtained. In other words, if the left "histogram mountain" is larger than the right "histogram mountain," the exposure compensation value B can be made smaller to reduce underexposed areas as much as possible in the process of correcting the exposure of the image. On the contrary, if the left "histogram mountain" is smaller than the right "histogram mountain," the exposure of the image should be compensated by paying attention to the right "histogram mountain" as much as possible to make possible more natural exposure compensation.

In the case of the exposure compensation with more emphasis on the high brightness side shown in FIG. 4, if the overall brightness range in the graph of the brightness distribution is 4 EV, the exposure compensation value B (whose unit is EV) can be determined by the following equation:

$$B=U\times S2/(S1+S2)\times(4/20),$$

where S1 is the area of the left "histogram mountain," S2 is the area of the right "histogram mountain," and U is a compensation value to correct only the exposure of the right "histogram mountain" in the graph of the brightness distribution.

In this equation, if −10, 24, and 19 are substituted for U, S1, and S2, respectively, the exposure compensation value B is B=−10×19/(24+19)×(4/20)=−0.88 EV. It means that an exposure compensation value of about −0.9 EV can make possible natural exposure compensation.

Next, the shooting and playback operations of the camera including the shooting support function and the still-image editing support function will be described in detail with reference to flowcharts of FIGS. 5 to 7.

Figure 5:
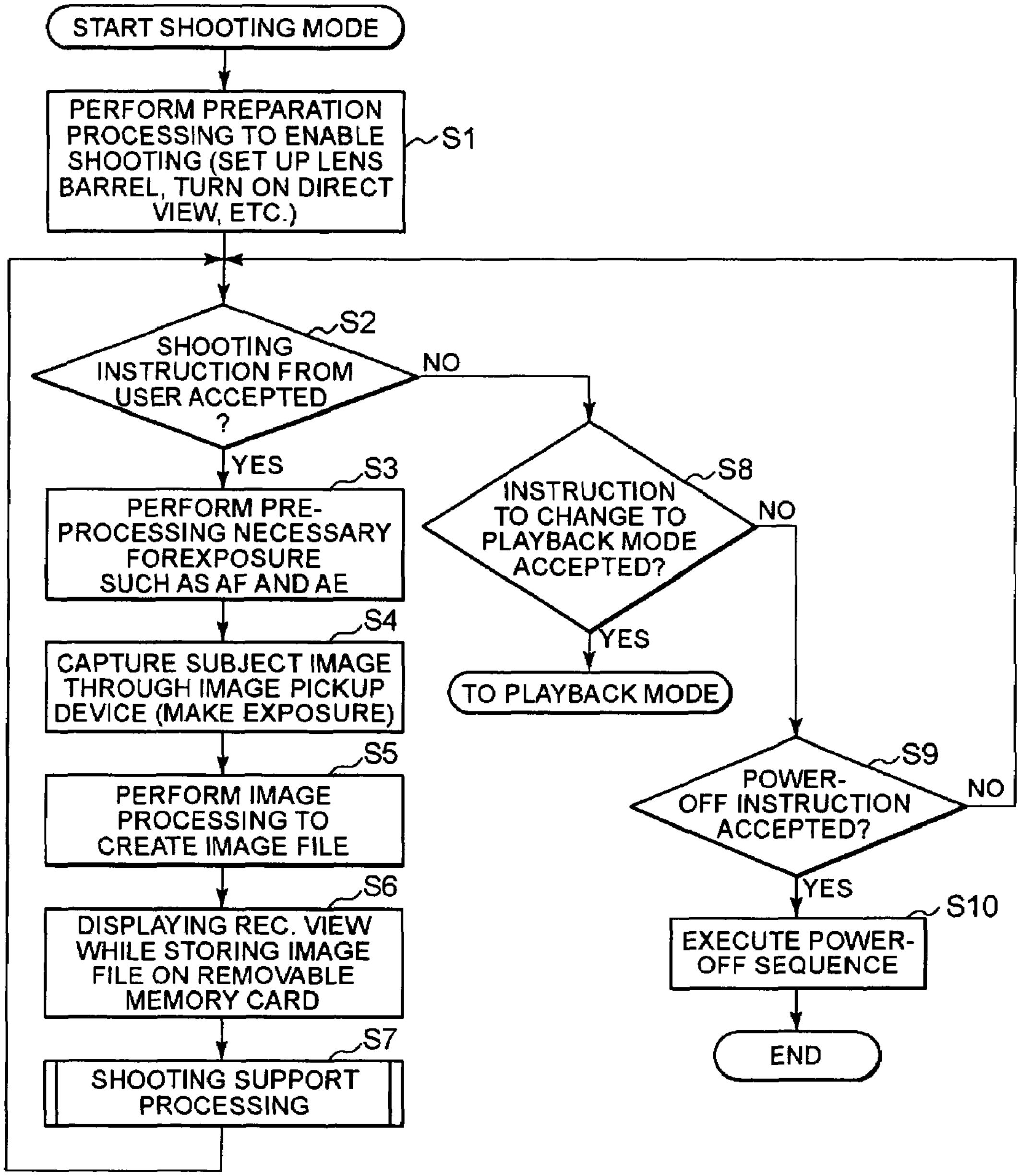
FIG. 5 is a flowchart showing the operation of the digital camera in a shooting mode.

FIG. 5 is a flowchart showing the operation of the camera in the shooting mode.

This flow is started, for example, when the shooting mode is instructed through the user's operation of the mode change button during power-on of the camera.

As shown, when the flow is started, preparation processing to enable shooting is first performed (S1). For example, processing to set up a lens barrel, turn on a live view, etc. is performed. Then, it is determined whether the camera accepts a shooting instruction, that is, whether the user presses the shutter button (S2).

If YES in S2, then the camera performs pre-processing necessary for exposure such as AF (Auto Focus) and AE (Auto Exposure)(S3), and the image pickup device 2 captures a subject image (an exposure is made) (S4). Image data of the subject image is then processed in a predetermined manner to create an image file (e.g., a JPEG image file) (S5). The created image file is recorded on the removable memory 9 while displaying a Rec. view during the recording of the image file (S6).

The Rec. view means that the shot image is displayed on the built-in LCD 12 for a predetermined period of time (e.g., seconds to tens of seconds) while the image file is being recorded, allowing the user to check the shot image immediately after shooting.

Then, shooting support processing for determining the tendency of brightness distribution of the image and performing predetermined processing is performed (S7) as described in detail later with reference to FIG. 6. After completion of the shooting support processing, the procedure returns to S2.

On the other hand, if NO in S2, then it is determined whether the camera accepts an instruction from the user to change to the playback mode through the user's operation of the mode change button (S8). If the determination result is YES, the procedure shifts to playback mode processing to be described later. On the other hand, if No in S8, then it is determined whether the camera accepts an instruction from the user to power off the camera through the user's operation of the power button (S9). If the determination result is YES, a power-off sequence is executed (S10) to end the flow. On the other hand, if NO in S9, the procedure returns to S2.

Figure 6:
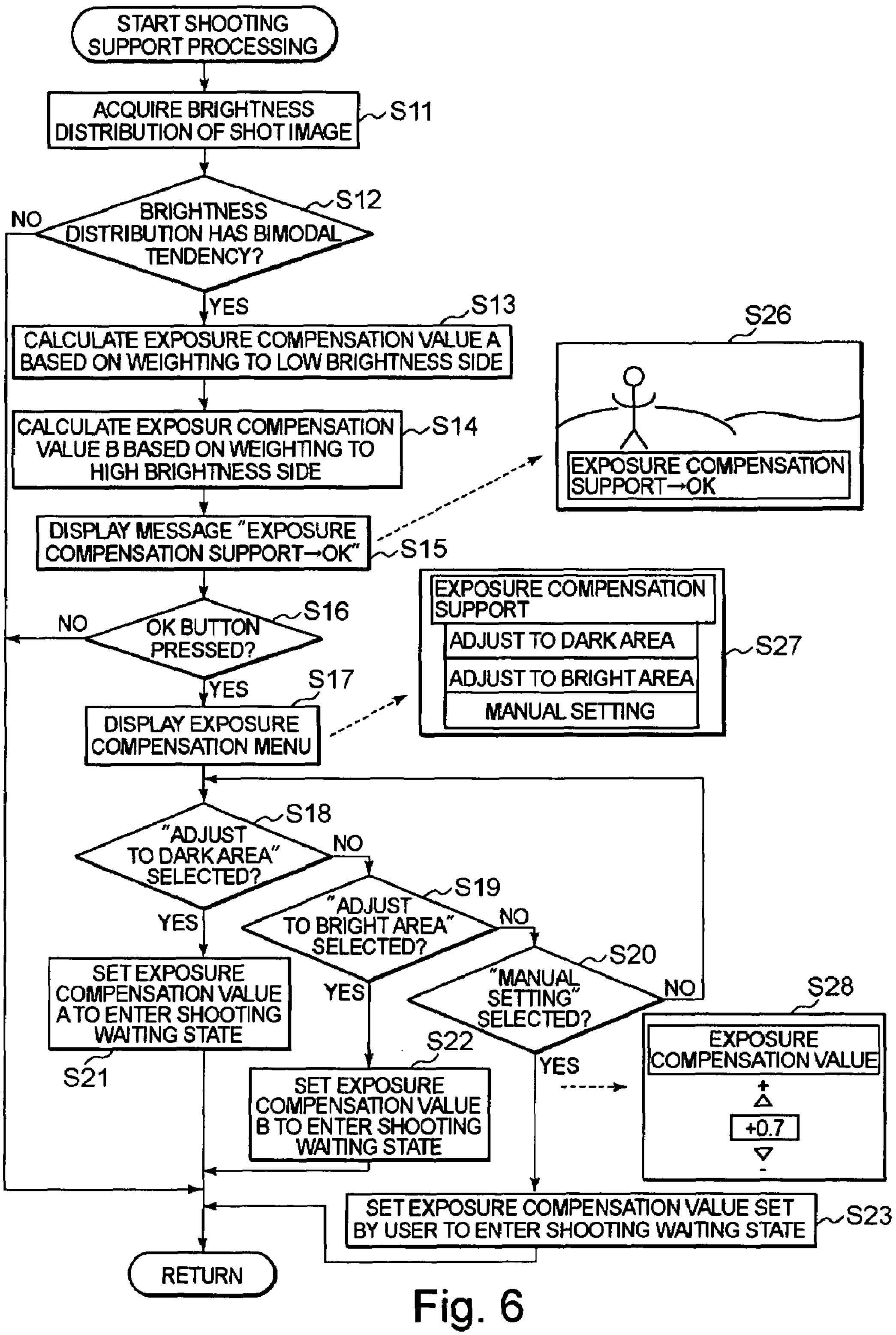
FIG. 6 is a flowchart showing shooting support processing (S7 of FIG. 5)

FIG. 6 is a flowchart showing the shooting support processing in S7.

Display screens 26, 27, and 28 shown in FIG. 6 are screen examples displayed on the built-in LCD 12 during the processing.

In FIG. 6, when the flow is started, a brightness distribution of the shot image (the subject image captured in S4 of FIG. 5) is first acquired (S11), and it is determined whether the brightness distribution has a bimodal tendency (S12).

If No in S12, the procedure returns to S2 of FIG. 5.

On other hand, if YES in S12, the exposure compensation value A based on weighting to the low brightness side to correct exposure for the "histogram mountain" on the low brightness side of the brightness distribution is calculated (S13) in the manner as described in connection with FIG. 3. Then, the exposure compensation value B based on weighting to the high brightness side to correct exposure for the "histogram mountain" on the high brightness side of the brightness distribution is calculated (S14) in the manner as described in connection with FIG. 4.

Then, a message "Exposure Compensation Support→OK" is displayed on the screen of a Rec. view, for example, on the display screen 26 in FIG. 6 to call up an exposure compensation support menu (S15), and it is determined whether the OK button is pressed (S16). This allows the user to select whether to use the exposure compensation support or not.

If NO in S16, the procedure returns to S2 of FIG. 5.

On the other hand, if YES in S16, the exposure compensation support menu (the above-mentioned submenu) with selection items "Adjust to Dark Area," "Adjust to Bright Area," and "Manual Setting," is displayed (S17) like the display screen 27 shown in FIG. 6. These selection items are possible options of shooting methods expected to fit the user's shooting intention as mentioned above.

It is then determined whether the user operates the arrow pad to select "Adjust to Dark Area" (S18), "Adjust to Bright Area," (S19), or "Manual Setting" (S20).

If the item "Adjust to Dark Area" is selected (YES in S18), the exposure compensation value A calculated in S13 is set to enter a shooting waiting state (S21). If the item "Adjust to Bright Area" is selected (NO in S18 and YES in S19), the exposure compensation value B calculated in S14 is set to enter the shooting waiting state (S22). If the item "Manual Setting" is selected (NO in S18, NO in S19, and YES in S20), a manual setting screen allowing the user to set an exposure compensation value like the display screen 28 shown in FIG. 6 is displayed. Then, the exposure compensation value manually set by the user on the manual setting screen is set to enter the shooting waiting state (S23).

After completion of the processing S21, S22, or S23, the procedure returns to S2 of FIG. 5.

According to the shooting operation described above with reference to FIGS. 5 and 6, when the brightness distribution of the shot image has a bimodal tendency, the exposure compensation support menu (see the display screen 27 in FIG. 6) appears to enable the display of possible options of shooting methods expected to fit the user's shooting intention. The user can select a desired option from the possible options displayed, making it easy to set an exposure compensation value (shooting condition) suitable for the shooting method desired by the user. This allows the next shot of the same subject to be taken in a way to fit the user's shooting intention, and hence the user to obtain an image according to his or her shooting intention.

Although the shooting support processing (S7 of FIG. 5) according to the embodiment is to determine the tendency of brightness distribution of a shot image after shooting and perform processing according to the determination result, it can also perform processing based on the result of determination on a tendency of brightness distribution of an image obtained before shooting, for example, that of a live image before shooting.

Figure 7:
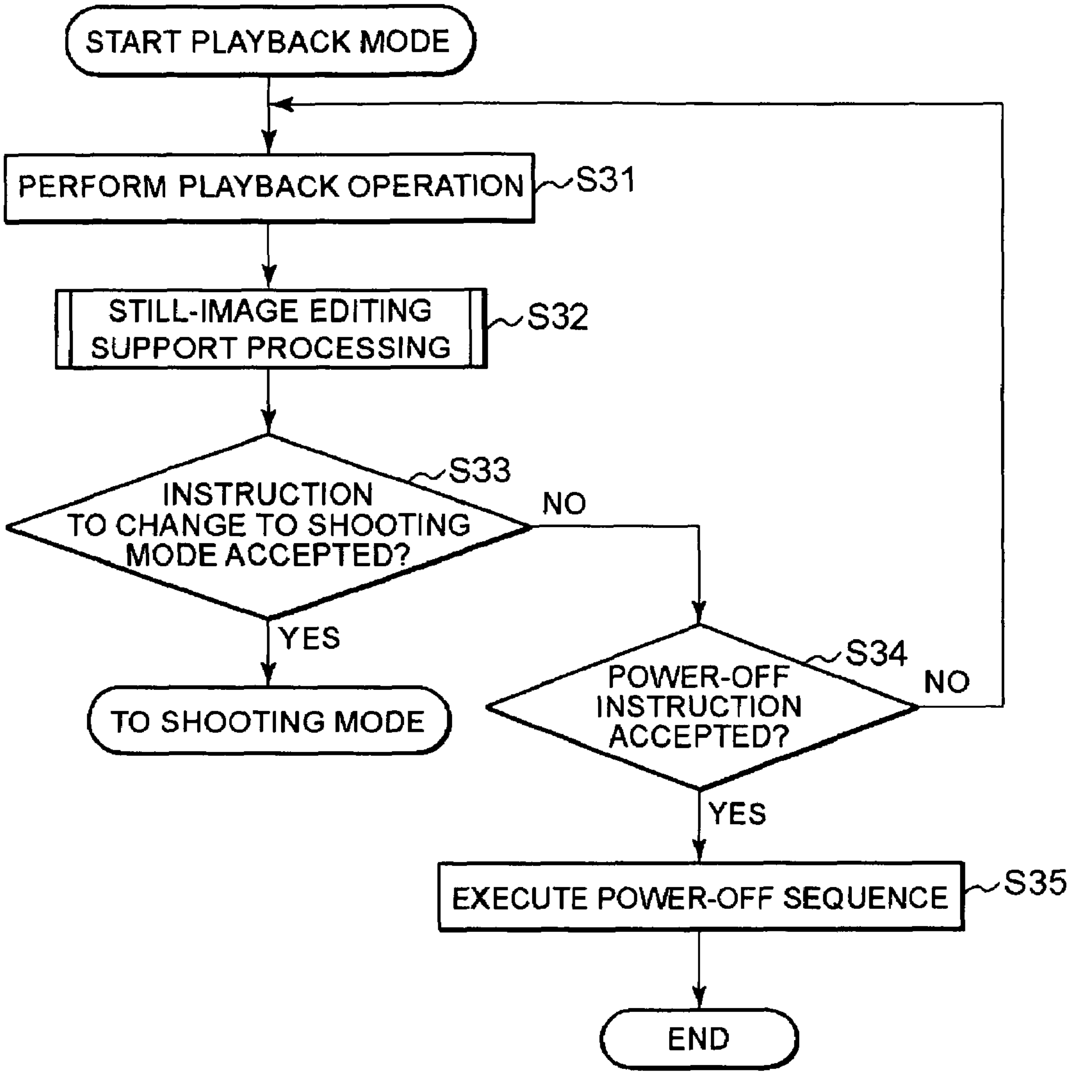
FIG. 7 is a flowchart showing the operation of the digital camera in a playback mode.

FIG. 7 is a flowchart showing the operation of the camera in the playback mode.

This flow is started, for example, when the playback mode is instructed through the user's operation of the mode change button during power-on of the camera.

As shown, when the flow is started, playback of an image is performed (S31) to perform still-image editing support processing for determining the brightness distribution of the image and performing predetermined processing according to the determination result (S32).

In this still-image editing support processing, though not shown in FIG. 7, it is determined whether the brightness distribution of the image played back in S31 has a bimodal tendency in the same manner as the algorithm of the shooting support processing (see FIG. 6). If it is determined to have a bimodal tendency, a display screen like the display screen 27 shown in FIG. 6 is displayed. Then, image processing is performed according to the item selected by the user. In this case, for example, the brightness of image pixels constituting the histogram mountain on the low brightness side can be increased, or the brightness of the image pixels constituting the histogram mountain on the high brightness side can be reduced. Alternatively, the brightness of pixels having a specific brightness value(s) can be adjusted, or the brightness of the image can be adjusted over all the pixel values (brightness values).

After completion of the still-image editing support processing, it is determined whether the camera accepts an instruction from the user to change to the shooting mode through the user's operation of the mode change button (S33). If the determination result is YES, the procedure shifts to the above-mentioned shooting mode processing. On the other hand, if NO in S33, then it is determined whether the camera accepts an instruction from the user to power off the camera through the user's operation of the power button (S34). If the determination result is YES, a power-off sequence is executed (S35) to end the flow. On the other hand, if NO in S34, the procedure returns to S31.

According to the playback operation described above with reference to FIG. 7, when the brightness distribution of the image played back has a bimodal tendency, the submenu appears to enable the display of possible options of still-image editing methods expected to fit the user's intention to edit the still image. The user can select a desired option from the possible options displayed, making it easy to edit the still image in a manner desired by the user.

As described above, according to the embodiment, even users who are unfamiliar with how to handle digital cameras can easily set shooting conditions for intended shooting and edit a still image in an intended manner.

In the embodiment, the shooting support function determines a tendency of brightness distribution of an image to determine the need for correction based on whether the image is beyond a predetermined range of present normal conditions. Then, based on the determination result, the shooting support function shows the user possible options of shooting methods, and sets the shooting condition according to the option selected by the user. However, instead of determining the tendency of brightness distribution of the image, the shooting support function can also determine, for example, a tendency of color distribution, contrast distribution, or a combination of these distributions, show the user possible options of shooting methods based on the determination result, and set the shooting condition according to the option selected by the user. The still-image editing support function also allows the user to edit the still image in the same manner as the shooting support function.

In the embodiment, the structural elements shown in FIG. 1 can also be referred to as follows: the built-in LCD 12 as a display part; and the operation part 15 as a selection part for allowing a user to select a correction item for a image data from correction content information displayed on the display part. The system controller 5 includes a determination part for determining whether acquired image data needs correcting, a correction-content display part for causing the display part to show correction contents preset for items determined to need correcting when the determination part determines that the image data needs correcting, and a correction part for correcting the acquired image data according to the correction item selected and displaying the image data corrected.

Each of the parts in the system controller 5 can also be configured as a circuit independent of one another.

While there has been shown and described what is considered to be a preferred embodiment of the invention, it will, of course, be understood that various modifications and changes in form or detail could readily be made without departing from the spirit of the invention. It is therefore intended that the invention not be limited to the exact form described and illustrated, but constructed to cover all modifications that may fall within the scope of the appended claims.

What is claimed is:

1. A digital camera which displays acquired image data on a display part, comprising:

a determination part for determining whether a brightness distribution of the acquired image data has a bimodal tendency of a high brightness side and a low brightness side;

a calculation part for calculating a first exposure compensation value weighted so that the exposure of a histogram mountain in the low-brightness side is optimized, and/or a second compensation value weighted so that the exposure of a histogram mountain in the high-brightness side is optimized when the determination part determines that the acquired image data has the bimodal tendency;

a correction-content display part for causing the display part to show a display for intent of adjusting the acquired image data to a low-brightness part and a display for intent of adjusting the acquired image data to a high-brightness part as correction information having correction items when the determination part determines that the acquired image data has the bimodal tendency;

a correction part for correcting the acquired image data based on the first exposure compensation value when the display for intent of adjusting the acquired image data to the low-brightness part is selected as a correction item from the displayed correction information, and correcting the acquired image data based on the second exposure compensation value when the display for intent of adjusting the acquired image data to the high-brightness past is selected as a correction item from the displayed correction information; and display control means for displaying the corrected image data on the display part.

2. The digital camera according to claim 1, wherein the correction-content display part further causing the display part to show a user-selection display for intent of user selection of an exposure compensation value, and the correction part corrects the acquired image data based on a compensation value input by a user when the user selected the display for intent user selection of the exposure compensation value.

3. The digital camera according to claim 1, wherein the correction part, when the display for intent of adjusting the acquired image data to the low-brightness part is selected, makes the first exposure compensation value less than in other cases when the histogram mountain in the high-brightness side is higher than the histogram mountain in the low-brightness side.

4. The digital camera according to claim 1, wherein the correction part, when the display for intent of adjusting the acquired image data to the high-brightness part is selected, makes the second exposure compensation value less than in other cases when the histogram mountain in the low-brightness side is higher than the histogram mountain in the high-brightness side.

5. An image display method of a digital camera for displaying acquired image data on a display part, comprising:

determining whether a brightness distribution of the acquired image data has a bimodal tendency of a high brightness side and a low brightness side;

calculating a first exposure compensation value weighted so that the exposure of a histogram mountain in the low-brightness side is optimized, and/or a second compensation value weighted so that the exposure of a histogram mountain in the high-brightness side is optimized when it is determined that the acquired image data has the bimodal tendency;

causing the display part to show a display for intent of adjusting the acquired image data to a low-brightness part and a display for intent of adjusting the acquired image data to a high-brightness part as correction information having correction items when it is determined that the acquired image data has the bimodal tendency;

correcting the acquired image data based on the first exposure compensation value when the display for intent of adjusting the acquired image data to the low-brightness part is selected as a correction item from the displayed correction information and correcting the acquired image data based on the second exposure compensation value when the display for intent of adjusting the acquired image data to the high-brightness part is selected as a correction item from the displayed correction information; and displaying the corrected image data on the display part.

6. The image display method of a digital camera according to claim 5, wherein when the display for intent of adjusting the acquired image data to the low-brightness part is selected, making the first exposure compensation value less than in other cases when the histogram mountain in the high-brightness side is higher than the histogram mountain in the low-brightness side.

7. The image display method of a digital camera according to claim 5, wherein when the display for intent of adjusting the acquired image data to the high-brightness part is selected, making the second exposure compensation value less than in other cases when the histogram mountain in the low-brightness side is higher than the histogram mountain in the high-brightness side.

* * * * *